United States Patent [19]
Abler

[11] Patent Number: 5,595,338
[45] Date of Patent: Jan. 21, 1997

[54] REUSABLE CONTAINER FOR A STACK OF COINS

[76] Inventor: Frederick F. Abler, P.O. Box 1022, San Luis Obispo, Calif. 93406

[21] Appl. No.: 348,458

[22] Filed: Dec. 2, 1994

[51] Int. Cl.$^6$ ................................................ B65D 65/04
[52] U.S. Cl. ................................................ 229/87.2
[58] Field of Search .......................... 229/87.2, 87.02, 229/87.12; 206/523

[56] References Cited

U.S. PATENT DOCUMENTS

| | | | |
|---|---|---|---|
| 674,853 | 5/1901 | Crane | 229/87.2 |
| 2,168,504 | 8/1939 | Youmans | 229/87.2 |
| 2,244,222 | 6/1941 | Slootsky | 229/87.2 |
| 2,507,626 | 5/1950 | Ekstrand | 229/87.2 X |
| 3,111,223 | 11/1963 | Jacobi | 206/523 |
| 3,347,450 | 10/1967 | Godwin | 229/87.2 |
| 3,750,871 | 8/1973 | Cook | 206/523 |

FOREIGN PATENT DOCUMENTS 478038  10/1969  Switzerland ................ 229/87.2

*Primary Examiner*—Jes F. Pascua
*Attorney, Agent, or Firm*—Daniel C. McKown

[57] ABSTRACT

A container for a stack of coins is formed from a length of flexible plastic lay-flat tubing. The container has the form of a hollow cylinder that is open at both ends. The coins are prevented from falling out of the retainer by toggle retainers formed at both ends of the tube by cutting and scoring or perforating operations performed on the container while it is in the flattened condition. These operations can conveniently be carried out on a flexographic converting system. The toggle retainers can readily be opened for removal of the coins, after which the flexibility of the walls of the container permit it to be flattened, thereby saving space during transport and storage of the empty containers. This encourages reuse, which makes the container attractive from the standpoint of both economics and ecology.

3 Claims, 3 Drawing Sheets

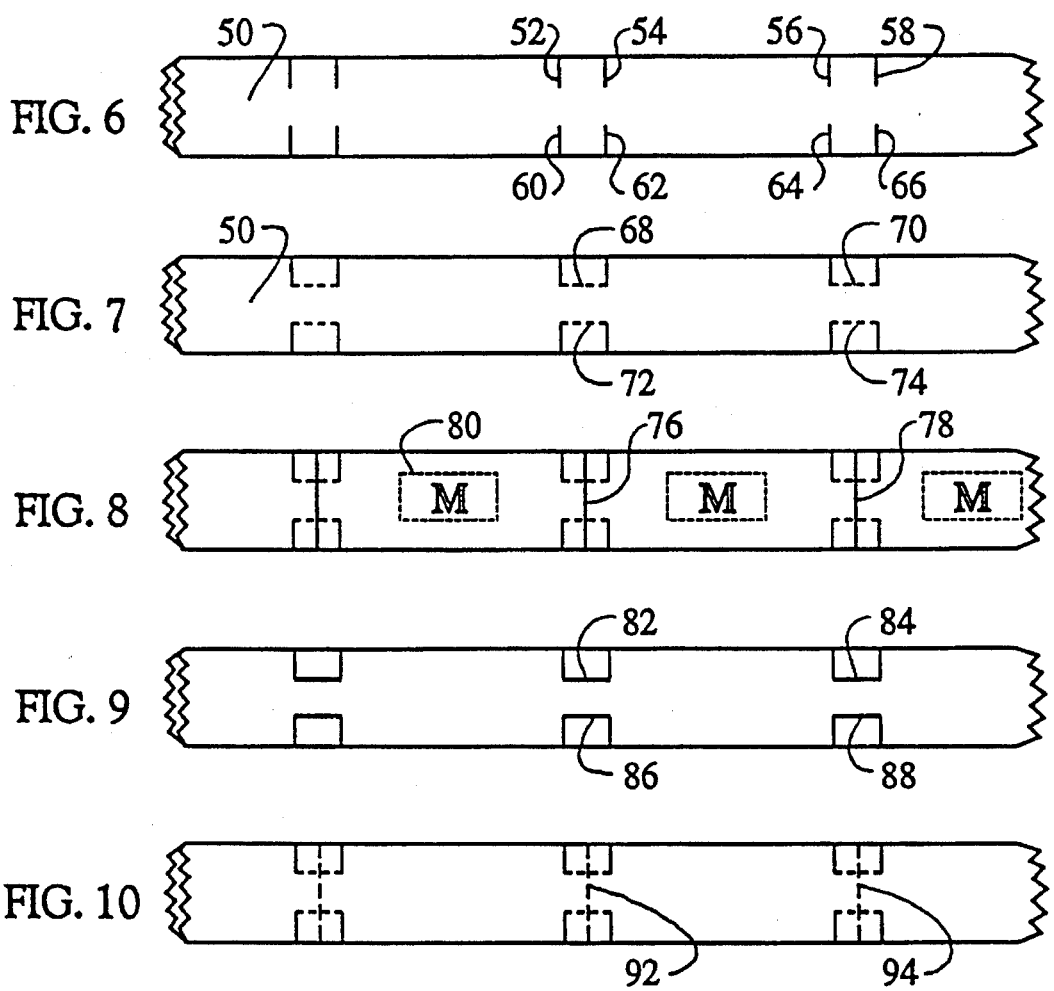

REUSABLE CONTAINER FOR A STACK OF COINS

BACKGROUND OF THE INVENTION

1. Field of the Invention

The present invention is in the field of coin handling and specifically relates to a reusable container for storing and transporting a stack of coins. In a preferred embodiment the container is composed of a flexible plastic film.

2. The Prior Art

A coin container known in the prior art is composed of plastic and is made by an injection molding process. It has a hollow tubular structure permanently closed at one end. It has semi-rigid walls which, in association with the closed lower end prevent the coin container from being flattened. Such a coin container is shown in FIGS. 1 and 2. In contrast with the present invention, the walls and the closed end of the prior art coin container are thicker and considerably stiffer than the walls of the coin container of the present invention.

In the prior art coin container, portions of the cylindrical wall adjacent the open end are molded to produce toggle retainers that are used to prevent coins from falling out of the tube. The user pushes radially inwardly on the marginal sections to cause them to snap into the configuration shown in FIG. 2 by an over-center or toggle action. The sections remain in the configuration shown in FIG. 2 until the user snaps them back to the configuration of FIG. 1.

Although this semi-rigid prior art coin container has found limited use by collectors of numismatic coins, the container has found very little use in the much larger market for commercial coin containers such as are used by banks and stores for storing and transporting coins. These institutions rely mainly on disposable coin containers such as paper wrappers which are redundantly wrapped around the coin stack and which have wide end margins which are subsequently crimped. Other institutions use "shrink-wrap" plastic wrappings that are thermally compounded to shrink tightly about the coins when heated. Approximately 12 billion paper coin wrappers are used each year, along with a comparable number of the plastic wrappings. Americans currently dispose of 7300 tons of paper coin wrappers annually.

The present inventor was curious to understand why the attractive reusable plastic coin container shown in FIGS. 1 and 2 is not competitive with the disposable paper and plastic wrappings that are widely used. It was learned that the sturdy construction of the container of FIGS. 1 and 2 necessitates its being reusable a great many times because of the cost of the plastic of which it is composed and the cost of the injection molding process. However, because of its closed end and semi-rigid cylindrical wall, the container, when empty, could not be flattened for transportation and storage. This caused the cost of transporting and storing the empty containers to be excessive, thereby hampering the reuse that is necessary to justify the initial cost of the plastic.

Thus, the present inventor recognized that for a plastic coin container to be truly reusable, it must be capable of being flattened for convenience in shipping and storage when empty.

SUMMARY OF THE INVENTION

Once the background facts related above were known to him, the present inventor set out to devise a reusable plastic container for a stack of coins that, when empty, could be flattened for economical storage and transport, so as to encourage reuse.

The present inventor immediately determined that the integrally-molded closed end of the prior art coin container of FIGS. 1 and 2 and its relatively thick semi-rigid walls would have to be eliminated to permit the desired coin container to be flattened for economical storage and transport. The formerly closed end was replaced by a closable toggle mechanism of the same type as used at the open end, and the thickness of the wall was reduced from approximately 0.040 inch to approximately 0.007 inch, i.e., by a factor of six, to eliminate the rigidity of the wall.

The thinness of the walls now made it impossible for the article to be manufactured by an injection molding method. The solution of this problem came when the inventor realized that the coin containers should be made, not by a process that involved injection of liquid plastic into a mold, but instead by starting with a length of lay-flat flexible film plastic tubing. Such tubing is known to be used in irrigating crops, and the tubing is available wound onto spools. The present inventor found that such lay-flat flexible film plastic tubing can be made into the desired coin containers by a process that involves cutting and either scoring or perforating certain portions of the flattened tubing to form the desired toggle retainers, and then cutting the flattened tubing into appropriate lengths to form the individual coin containers, as will be described in greater detail below.

Further questions still remained. Would the retainers still maintain their ability to toggle when made of such thin and relatively flexible material? Would the toggle retainers survive repeated toggling as required for a reusable container? As will be shown below, the present inventor has perfected a design in which these questions can be answered in the affirmative.

Thus, in accordance with the present invention, a practical reusable plastic coin container capable of being flattened when empty has been devised, along with a practical low-cost process for manufacturing it.

The novel features which are believed to be characteristic of the invention, both as to its structure and method of manufacture, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 6 is a fractional top plan view showing a specimen of lay-flat tubing after a cutting step has been performed in a preferred method of manufacturing the coin container of the present invention;

FIG. 7 is a fractional top plan view showing the specimen of FIG. 6 after a perforating step has been performed in a preferred method of manufacturing the coin container of the present invention;

FIG. 8 is a fractional top plan view showing the specimen of FIG. 7 after a sheeting step has been performed in a preferred method of manufacturing the coin container of the present invention;

FIG. 9 is a fractional top plan view showing the specimen of FIG. 6 in an alternative embodiment after a scoring step has been performed;

FIG. 10 is a fractional top plan view showing the specimen of FIG. 7 in an alternative embodiment after a sheeting scoring step has been performed; and, FIG. 11 is a graph comparing the cost per use of various types of coin containers.

DETAILED DESCRIPTION OF THE PREFERRED EMBODIMENT

Figure 1:
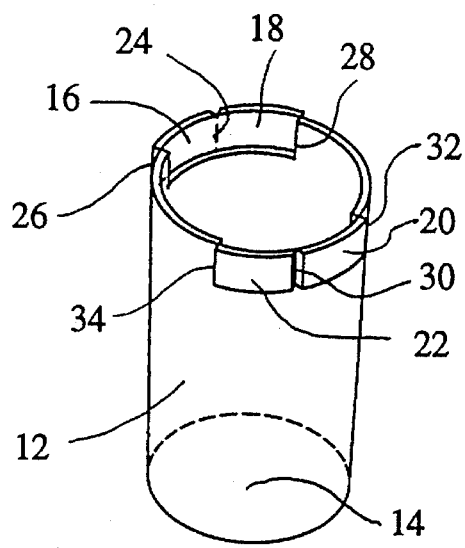
FIG. 1 is a front top perspective view showing a coin container of the prior art with its toggle retainer in an open position to permit coins to be inserted or removed from the container.
Figure 2:
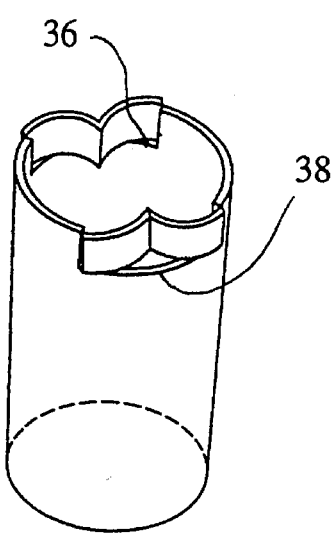
FIG. 2 is a front top perspective view of the prior art coin container of FIG. 1 with its toggle retainer in a closed position to prevent coins from falling out of the container during handling of the container.

FIGS. 1 and 2 show a coin container known in the prior art. It is composed of a translucent plastic material. The cylindrical wall 12 is approximately a millimeter thick and for that reason is semi-rigid. The entire coin container of FIGS. 1 and 2 is formed by an injection molding process, including an end 14 and four marginal portions 16, 18, 20, and 22. The portions 16 and 18 together make up a first toggle retainer, and the portions 20 and 22 make up a second toggle retainer. The portions 16 and 18 are joined to each other by a hinge line 24 and are joined respectively to the cylindrical wall 12 by the hinge lines 26 and 28. Likewise, the portions 20 and 22 are joined to each other by the hinge line 30, and are joined respectively to the cylindrical wall 12 by the hinge lines 32 and 34. All of the above hinge lines extend in a direction parallel to the axis of the cylindrical wall 12 and serve as "living" hinges.

Circumferential slots 36 and 38 permit the first and second toggle retainers to snap from their open position shown in FIG. 1 to a closed position shown in FIG. 2. The open position is used when coins are being inserted or removed from the container, and thereafter, the toggle retainers are squeezed together in a radially inward direction to the closed position of FIG. 2 that is used to prevent the coins from falling out of the container during handling.

The coin container of the prior art, shown in FIGS. 1 and 2 includes the closed end 14 which, along with the semi-rigid cylindrical wall 12 makes it impossible to flatten the coin container for convenience in transport and storage. Because of the thickness of the cylindrical wall 12 and of the end 14, the container includes more than a negligible amount of plastic, and this makes the container relatively expensive compared to the paper and shrink-wrap containers with which it must compete.

Figure 11:
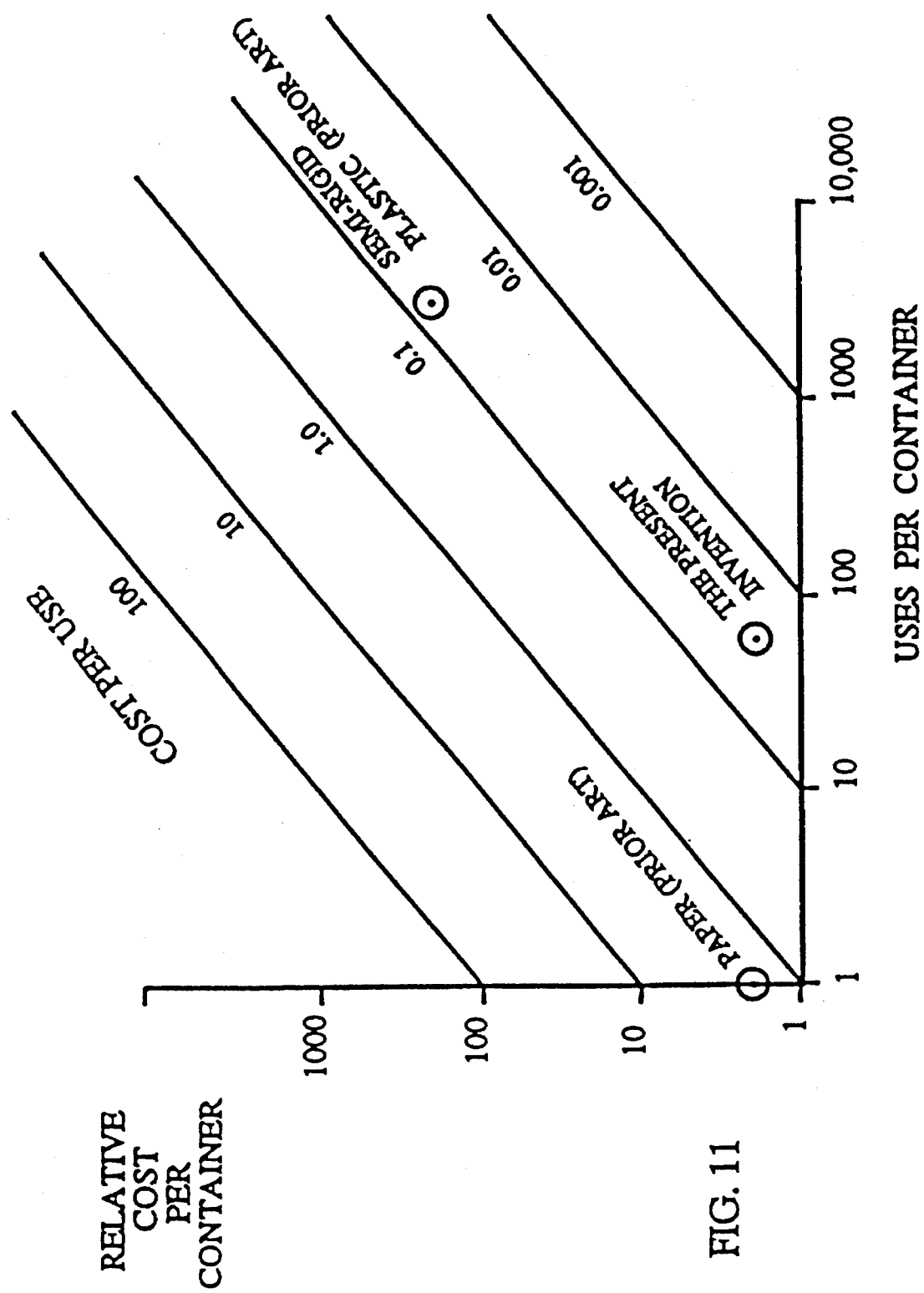

FIG. 11 is a useful comparison of the coin container of FIGS. 1 and 2 against the present invention and against the disposable paper wrappers currently in wide use. From FIG. 11 it is seen that although the paper wrapper is the least expensive, it is a disposable item and no attempt is made to reuse it.

In contrast, the semi-rigid plastic container can theoretically be used several thousand times, but it costs considerably more than the paper container.

The coin container of the present invention falls in between the two extremes represented by the disposable paper container and the reusable semi-rigid plastic container of FIGS. 1 and 2.

The cost per use of the semi-rigid plastic container shown in FIG. 11 is accurate only if the semi-rigid plastic container is reused several thousand times. However, because that container cannot be flattened for storage and transport, it is not likely to be reused to any great extent, because the cost of shipping and storing the un-flattened semi-rigid plastic container is prohibitive.

In contrast, the coin container of the present invention can easily be flattened for storage and transport, and therefore is likely to be reused until it wears out. A force of less than 0.5 pound applied uniformly to squeeze the coin container of the present invention will flatten it. In its flattened condition, the coin container of the present invention is easier to print on than the curved wall of the semi-rigid plastic container.

The wall of the semi-rigid plastic container is approximately a millimeter thick. In contrast, because of its paper-thin wall, the coin container of the present invention is easily flattened for storage and transport. Approximately 100 coin containers of the present invention when flattened can be stored in the volume required for a single one of the semi-rigid plastic containers of the prior art.

Figure 3:
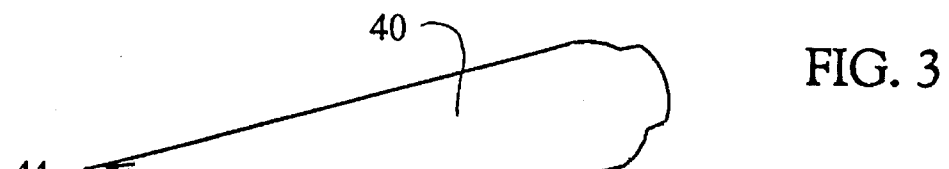
FIG. 3 is a perspective view showing the coin container of the present invention filled with coins and with the toggle retainers in a closed position.
Figure 4:
FIG. 4 is a perspective view showing the coin container of FIG. 3 after the toggle retainers have been snapped to an open position, after the coins have been removed and after the coin container has been partially flattened.
Figure 5:
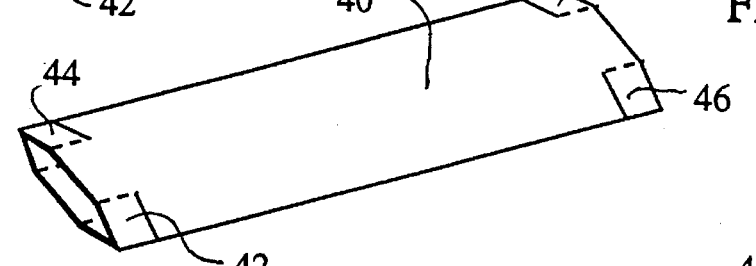
FIG. 5 is a perspective view showing the coin container of FIG. 4 after it has been completely flattened for storage or transport.

The coin container of the present invention is shown in FIGS. 3, 4, and 5. It differs in structure from the prior art coin container of FIGS. 1 and 2 in several significant ways. First, the cylindrical wall 40 of the container of the present invention is paper thin, approximately 0.007 inch, which makes the cylindrical wall flexible and easily flattened, in contrast to the semi-rigid wall 12 of the prior art container which is approximately 0.040 inch thick.

Second, the coin container of the present invention is open at both ends, in contrast to the closed end 14 of the container of FIGS. 1 and 2. Elimination of the closed end is essential to permit the coin container of the present invention to be flattened.

Third, the coin container of the present invention includes toggle retainers at both ends.

These structural differences produce an extremely important result, namely, that the coin container of the present invention can be flattened for storage and transport, thereby making its reuse practical. In contrast, reuse of the coin container of FIGS. 1 and 2 is not practical because it cannot be flattened and therefore takes up a greatly excessive amount of space during storage and transport, thereby making reuse impractical.

Although the toggle retainers 42 and 44 used in the present invention are conceptually the same as those used on the prior art coin container, it was by no means evident that the toggle action would occur when the wall thickness was drastically reduced from that of the prior art containers. Also, it was far from clear how many cycles of operation the toggle retainer could endure with such a thin material. The present inventor put these doubts to rest by extended experimentation.

As best seen in FIG. 4, a second pair of toggle retainers 46 and 48 are provided at the opposite end.

FIG. 5 shows the coin container of the present invention after it has been flattened for storage and transport.

In the preferred embodiment, the coin container is composed of polyvinylchloride. In an alternative embodiment the coin container is composed of polyethylene, and in other embodiments it is composed of polypropylene or other polyolefins.

Although the structural differences described above distinguish the present invention from the prior art of FIGS. 1 and 2, an equally important breakthrough was made in the method of manufacturing coin containers. The paper coin wrappers mentioned above are supplied in the form of flat sheets in which the stack of coins is rolled up. On the other hand, the coin container of FIGS. 1 and 2 is formed by an injection molding process.

Neither of these manufacturing methods are used for making the coin containers of the present invention.

Instead, in the preferred embodiment, the method of making the coin containers starts with the provision of a roll of lay-flat flexible film plastic tubing. This material is widely available and is supplied in rolls. Practical use of such tubing is found in agricultural drip tape widely used for irrigation purposes.

This unique starting material is then run through a machine called a flexographic web converting system. An example of such a machine is the Mark Andy Model No. 830 Converting System manufactured by Mark Andy, Inc. of Chesterfield, Mo.

At the beginning of the method of making the coin containers of the present invention, in a preferred embodiment a roll of lay-flat flexible film plastic tubing is inserted into the flexographic converting system. During the operation of the system, the tubing retains its flattened condition. At a first station a repeating pattern of pairs of opposed transverse blind cuts are inflicted on the lay-flat tubing. FIG. 6 shows the tubing 50 after the blind cuts 52, 54, 56, 58, 60, 62, 64 and 66 have been made. The spacing between the cuts 54 and 56 and between the cuts 62 and 64 is equal to the height of the stack of coins that is to be packaged. The spacing between the cuts 52 and 54 and between the cuts 60 and 62 is equal to twice the axial dimension of the marginal portions that will ultimately form the toggle retainers. The cuts 60, 62, 64 and 66 are juxtaposed with the cuts 52, 54, 56 and 58, respectively.

Next, normally at a subsequent station, a number of lines of perforation 68, 70, 72 and 74 are imposed on the lay-flat tubing 50. As best seen in FIG. 7, these lines of perforation extend lengthwise of the lay-flat tubing 50 and connect the blind ends of the cuts 52 and 54, 56 and 58, 60 and 62, and 64 and 66, respectively.

In a first alternative embodiment, shown in FIG. 9, the lines of perforation 68, 70, 72 and 74 are replaced by score lines 82, 84, 86, and 88. At this time, perforations are preferred to score lines because of the difficultly of maintaining accurately a selected depth of score.

As best seen in FIG. 8, in the next step of the method of making the coin containers, sheeting cuts 76 and 78 are produced at a third station of the flexographic converting machine. These cuts extend laterally completely across the lay-flat tubing, which by these cuts is chopped into sections that are shown in FIG. 5. The sheeting cuts 76 and 78 are located midway between the blind cuts 52 and 54 and between the blind cuts 56 and 58, respectively. The sheeting cuts separate the individual coin containers, so that they can be stacked one on another.

Some users of the coin containers will prefer to receive the containers connected end-to-end, either in a single roll or zig-zag folded, in accordance with the user's dispensing device. To accommodate this possibility, the sheeting cuts 76 and 78 are replaced, in an alternative embodiment shown in FIG. 10, with lines of perforation 92 and 94, or with score lines in yet another embodiment.

To avoid having an excessive number of claims to include all of the possible combinations of score lines and lines of perforations, a generic term "lines of weakness" is used in the claims. The term "lines of weakness" includes score lines and lines of perforations but not cuts. Both score lines and lines of perforations may be thought of as incomplete cuts, and both weaken the film along the line of weakness, thereby justifying the generic use of the term.

In alternative embodiments, the steps shown in FIGS. 6, 7 and 8 may be combined. For example, the lines of perforation and the blind cuts may be produced simultaneously by a single die.

In alternative embodiments, the flexographic converting machine also prints a legend 80 on each coin container.

Although in the preferred embodiment the lay-flat tubing is composed of an extruded seamless plastic, in other embodiments the lay-flat tubing may be composed of paper or metal and may include a seam. Typically, paper has not been favored because of the difficulty of producing a seamless tube and because of its lack of resiliency; and metal has not been used because of its cost. However, for certain applications these alternative materials might have advantages that outweigh their disadvantages.

The widest market presently seen for the containers of the present invention is for coins, and for this reason the invention has been called a coin container. However, it can be appreciated that specialized markets exist where instead of a stack of coins the container encloses a stack of casino tokens or a stack of indigestion tablets. Nor are the uses limited to stacks of disc-like objects. Cylindrical objects such as flashlight batteries or fluorescent lamps could also be packaged in the container of the present invention. The inventor's rights are, of course, limited only by the structures recited in the appended claims, and not by what the structure is later called or used for.

Thus, there has been described a method for making a coin container. The method is noteworthy for its starting material which is a flexible lay-flat tubing. The resulting coin container includes structural features that distinguish it from coin containers known in the prior art. Specifically, the entire coin container including its cylindrical wall is flexible instead of being semi-rigid, the container is open at both ends because a closed end would prevent it from being flattened, and both ends include marginal portions that cooperate to form toggle retainers that prevent the coins stored in the container from falling out during handling.

As described in connection with FIG. 11, the coin container of the present invention offers a relatively low cost per use. Although it is more expensive to produce than a paper coin container, unlike the paper coin container it is reusable, thereby achieving a lower cost per use. Compared to the semi-rigid plastic coin container of the prior art, the present invention is much less expensive to produce initially, and although the present invention may be less durable than the semi-rigid plastic container of the prior art, the reusability of the present invention results in a lower cost per use.

Considering that approximately 12 billion paper coin wrappers are used per year, a total of 7300 tons of paper per year, the reusability of the plastic containers of the present invention results in an enormous saving of natural resources.

The foregoing detailed description is illustrative of several embodiments of the invention, and it is to be understood that additional embodiments thereof will be obvious to those skilled in the art. The embodiments described herein together with those additional embodiments are considered to be within the scope of the invention.

What is claimed is:

1. A container for a stack of coins comprising:

a hollow cylinder of a flexible material, open at both ends, including at each end at least two marginal portions connected together to form a toggle retainer, and sufficiently flexible that it can be flattened by an applied force less than one pound.

2. A container for a stack of coins comprising:

a flattened segment of lay-flat tubing having a rectangular shape including two sides and two ends and having blind cuts adjacent but spaced from the ends and extending parallel to the ends from both sides to blind ends, and having lines of weakness extending parallel to the sides from both ends to the blind ends of the blind cuts.

3. The container of claim 2 wherein said lay-flat tubing is composed of a flexible plastic film.

\* \* \* \* \*